United States Patent

[11] 3,584,788

| [72] | Inventor | Richard W. Lloyd |
| | | Lewiston, Idaho |
| [21] | Appl. No. | 789,213 |
| [22] | Filed | Jan. 6, 1969 |
| [45] | Patented | June 15, 1971 |
| [73] | Assignee | The Lloyd Ranch |
| | | Lewiston, Idaho |

[54] SWATH MARKER FOR FIELD SPRAYING DEVICE
6 Claims, 4 Drawing Figs.

[52] U.S. Cl................................................. 239/172
[51] Int. Cl.................................................. E01c 19/16
[50] Field of Search...................................... 239/172, 170, 164

[56] References Cited
UNITED STATES PATENTS
2,969,921  1/1961  Tygart........................... 239/172 X
3,211,381  10/1965  Rasmussen.................... 239/172 X FOREIGN PATENTS
233,214  4/1961  Australia........................ 239/172

Primary Examiner—Lloyd L. King
Assistant Examiner—Thomas C. Coup, Jr.
Attorney—Wells & St. John ABSTRACT: A swath marker is described for applying spaced spots of visible marking fluid along the edge of a swath of soil or foliage traversed by an agricultural implement. The swath marker is mounted on the agricultural implement and has a separate small tank containing the marking liquid and an electrically operated diaphragm pump for pumping marking liquid to a spray nozzle at one end of the spray vehicle for marking the edge of the swath. An adjustable timer is operably connected to the diaphragm pump for activating the pump as desired intervals.

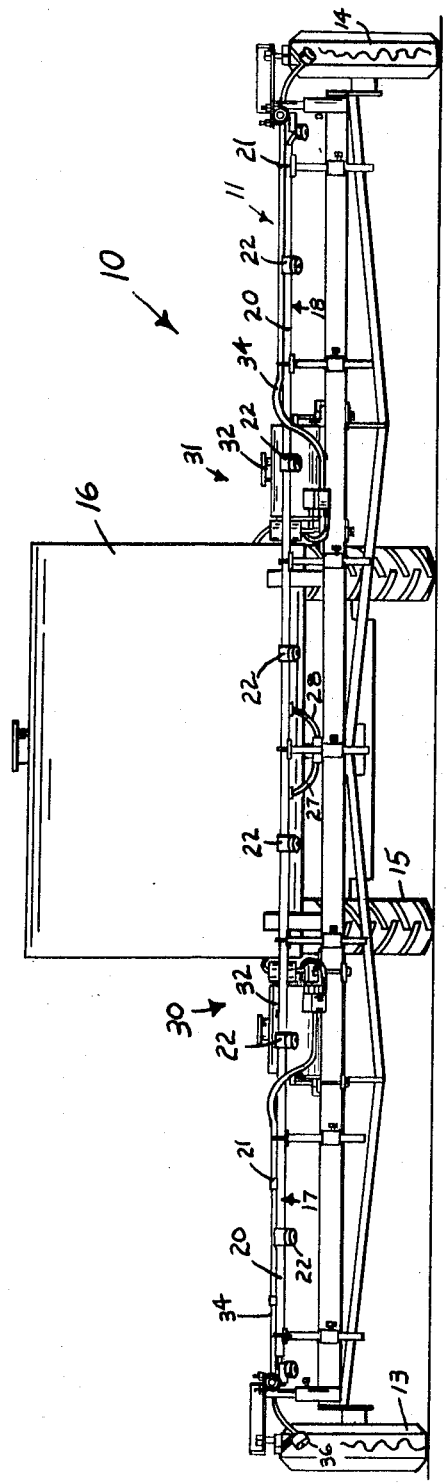

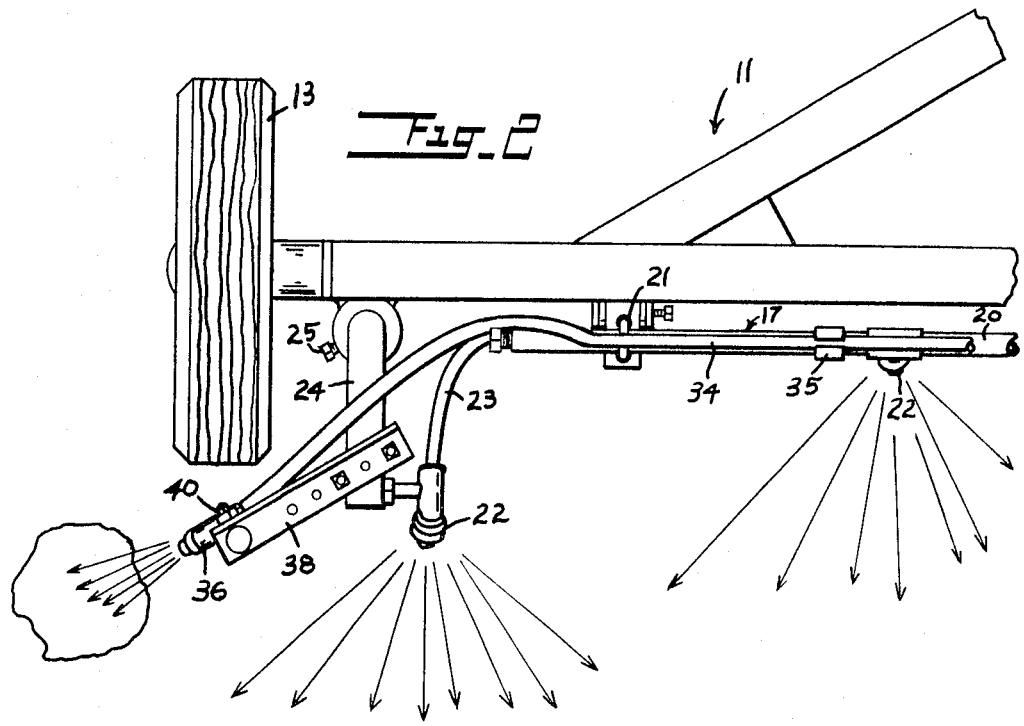

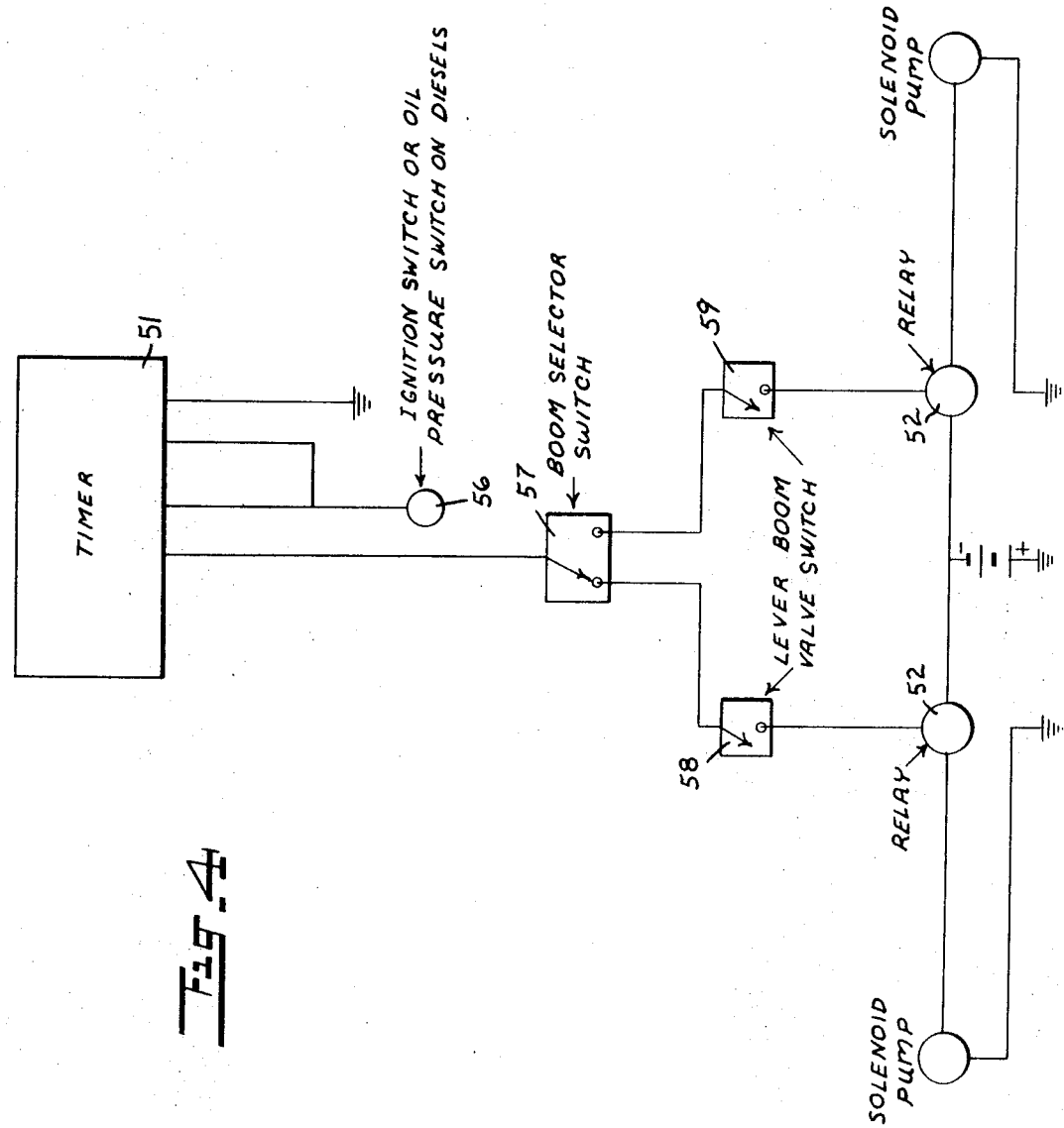

SWATH MARKER FOR FIELD SPRAYING DEVICE

BACKGROUND OF THE INVENTION

This invention relates to agricultural implements and more particularly to marking devices on agricultural implements for visually designating the area or swath of the soil or foliage traversed by an agricultural implement such as a liquid spray vehicle.

Frequently, it is very important for a farmer to be able to tell the soil or foliage which has been traversed by a farm implement. Mechanical markers have long been used but have many disadvantages and limited applicability.

A significant problem presented to many farmers is to efficiently and evenly apply agricultural chemicals such as fertilizers, pesticides or weed killers to the soil without overlapping the application or without leaving areas with no application.

Several marking devices have been devised for overcoming this problem, however, many of them are quite expensive and are incapable of being adapted to presently used spray vehicles.

One of the principal objects of this invention is to provide a swath marking device for an agricultural implement that is inexpensive to operate and capable of being readily adapted to presently used spray vehicles.

An additional object of this invention is to provide a marking device utilizing a marking fluid that is not mixed with an agricultural chemical being applied to the soil.

A further object of this invention is to provide a marking device that sprays spaced spots of marking liquid on the ground along one edge of the swath of soil or foliage traversed by the implement.

An additional object of this invention is to provide a swath marker that conserves the use of marking liquid without compromising the results.

These and other objects of this invention will become apparent upon the following detailed description of a preferred embodiment.

BRIEF DESCRIPTION OF THE DRAWINGS

A preferred embodiment of this invention is illustrated in the accompanying drawings, in which:

FIG. 1 is a rear view of an agricultural implement being pulled by a tractor in which marking devices are mounted thereon for visually designating the swath of soil traversed by the agricultural implement as the vehicle is propelled;

FIG. 2 is a fragmentary plan view of one side of the implement illustrating the mounting of several elements of a marking device;

FIG. 3 is a schematic line diagram of the components of the marking device; and

FIG. 4 is an electrical schematic of the control system for the marking device.

DETAILED DESCRIPTION OF A PREFERRED EMBODIMENT

The swath marker herein described may be used on several different types of agricultural implements from spray implements to cultivator implements. For purpose of illustration the swath marker will be described in relation to a spray implement.

A rear view of an agricultural spray implement is illustrated in FIG. 1 designated in general by the arrow 10. The agricultural spray implement 10 is pulled by a mobile prime mover, such as a tractor 15. The implement 10 has an elongated mobile frame 11 supported between wheels 13 and 14 at its extremity. The spray vehicle is considerably wider than the prime mover 15 to spray a wide swath of chemicals on the soil or foliage as the vehicle 10 is propelled over the soil.

The spray vehicle has a large storage tank 16 mounted centrally thereon containing agricultural chemicals such as fertilizers, pesticides or weedkillers. Elongated spray booms 17 and 18 extend outwardly from the central portion of the vehicle to the wheels 13—14 respectively transversely to the intended direction of travel. Each of the spray booms 17 and 18 includes a manifold pipe 20 that is mounted by brackets 21 to the elongated frame 11. Spray nozzles 22 were mounted along the manifold pipe and directed downwardly for spraying the agricultural liquid onto the ground. The spray nozzles are generally evenly spaced to provide an even distribution of the agricultural liquid on the soil as the vehicle is propelled along. The outermost spray nozzle is mounted to a flexible manifold section 23 (FIG. 2) that is supported by an adjustable bracket 24 that swings outwardly or inwardly as desired. A lock bolt 25 locks the bracket 24 when the outermost spray nozzle is in its desired position.

Distribution tubes 27—28 (FIG. 1) extend from the large storage tank 16 to each of the spray booms 17 and 18 respectively.

The flow of the agricultural liquid from the large storage tank 16 to the nozzles 22 is generally regulated by the operator of the prime mover.

To physically mark the swath of soil or foliage being applied with agricultural chemical, swath marking devices 30 and 31 are mounted on the spray booms 17 and 18 respectively. The marking devices 30 and 31 are capable of spraying marking liquid onto the soil along the edges of the swath to clearly point out to the operator, the soil or foliage that has received the agricultural chemical. Each of the marking devices 30 and 31 includes a small storage tank 32 that is mounted on the elongated frame containing the marking fluid. It has been found that a marking fluid containing an aluminum pigment paint in diesel oil in the ratio of 1 pound of aluminum pigment paste to 5 gallons of diesel oil is quite adequate for most purposes.

The discharge line of the small storage tank extends to a solenoid operated diaphragm pump 33 that is also mounted on the wide mobile frame. From the pump 33 a flexible line 34 extends along the spray boom 17 or 18 and is secured thereto by clamps 35 (FIG. 2). The flexible line extends to a cone jet nozzle 36 that is mounted on a bracket 38 secured to the adjustable bracket 24. The cone jet nozzle 36 is designed to operate to spray liquid when the pressure in the line 34 exceeds a preset value. It has been found that the apparatus operates efficiently when the jet nozzle is set to spray at 5 p.s.i. or above.

A universal joint connection 40 (FIG. 2) interconnects the cone jet 36 with the bracket 38 to enable the cone jet nozzle 36 to be directed in any desired direction. The nozzle 36 is generally directed to spray the marking fluid along the edge of the swath traversed by the implement to clearly indicate where the chemical has been applied.

To provide a uniformly consistent marking fluid, an agitator or stirring device 44 (FIG. 3) is mounted in the small storage tank 32 for agitating the fluid as the vehicle is propelled over the ground. The agitator includes a freely rotatable shaft 45 that extends between the sides of the tank. A U-shaped stirring rod 46 is connected to the shaft for agitating the marking fluid. A crank 47 is connected to the outside of the shaft 45 so that the operator may initially stir the marking fluid before he begins operation. The weight of the crank 47 and of the stirring rod 46 cause the rod 46 to oscillate back and forth as the vehicle is propelled over the soil to further agitate the fluid.

Each of the marking devices 30 and 31 are controlled by a control circuit 50 to activate the solenoid operated diaphragm pump 33 to eject marking fluid from the nozzle 36 at desired spaced intervals as the vehicle is propelled over the soil. The control circuit 50 includes an electronic timer 51, a relay 52 and a battery or electrical source 53. The electrical timer 51 may be adjusted to vary the time interval between energizing the solenoid diaphragm pump to vary the spacing of the marker spots to compensate for varying field conditions and speeds of the vehicle. The control circuit 50 may be placed in an overall electrical system in cooperation with an ignition switch 56 (FIG. 4) that is mounted on the prime mover to initially activate the control circuit. A boom selector switch 57 may also be mounted on the prime mover to select which marking device 30 or 31 is to be used, depending upon the intended path. Lever boom valve switches 58 and 59 are positioned on the vehicle to render either marking device 30 or 31 operable.

With this control arrangement the spacing of the spots of marking fluid ejected from the cone jet nozzles may be varied depending upon the field conditions and the speed of the vehicle. The electronic timer is set to generate an electrical pulse of 1 second in duration over a wide variable frequency of between 5 to 30 second intervals.

The solenoid operated diaphragm pump 33 is designed to operate once for each electrical pulse received, to pump approximately 1 teaspoon of marking fluid to the nozzle under about 40 pounds of pressure.

It is understood that the above described embodiment is simply illustrative of the principles of this invention and that numerous other embodiments may be devised without deviating from the scope thereof. Therefore, only the following claims are intended to define the invention.

What I claim is:

1. A vehicle for applying agricultural chemicals to the soil, comprising:
   a. a mobile frame that may be propelled over the soil;
   b. an elongated spray boom mounted on the frame transversely to the direction in which the mobile frame is to be propelled;
   c. a large storage tank mounted on the frame for containing a large quantity of agricultural chemicals;
   d. a plurality of agricultural chemical spray nozzles mounted along the spray boom and operatively connected to the large storage tank for directing a wide swath of agricultural chemicals onto the soil as the mobile frame is propelled over the soil, in which the improvement comprises a marking device for visibly designating a swath, in which the marking device includes:
   e. a small storage tank mounted on the frame containing marking liquid;
   f. a marking liquid spray nozzle mounted on the spray boom adjacent one end of and operatively connected to the small storage tank;
   g. a solenoid operated diaphragm pump mounted on the movable frame for pumping marking liquid from the small storage tank to the spray nozzle;
   h. a relay electrically connected to the solenoid for activating the solenoid operated pump; and
   i. an adjustable timer that is electrically connected to the relay to activate the relay at desired intervals to operate the diaphragm pump to pump fluid at the same interval through the nozzle and onto the soil to provide spaced liquid marking spots alongside the agricultural liquid swath to clearly designate the swath.

2. A vehicle for applying agricultural chemicals in the soil as defined in claim 1 wherein the marking liquid spray nozzle is operable to spray marking liquid onto the ground adjacent one end of the boom when the marking liquid pumped to the spray nozzle exceeds a prescribed pressure.

3. A vehicle for applying agricultural chemicals to the soil as defined in claim 2 wherein the prescribed pressure above which the spray nozzle is set to spray liquid is 5 p.s.i.

4. A vehicle as defined in claim 1 wherein the marking device further includes a liquid agitator movably mounted in the small storage tank to stir the marking liquid while the mobile frame is propelled.

5. A vehicle as defined in claim 1 wherein the marking liquid consists substantially of 1 pound of aluminum paint pigment paste per each gallon of diesel oil.

6. A vehicle as defined in claim 1 wherein the timer is set to activate the relay once every interval of between 5 seconds to 30 seconds.